Aug. 12, 1969  SACHIO MAEDA ETAL  3,461,056
ELECTROLYTIC MACHINING AND GRINDING APPARATUS
WITH GRAPHITE ELECTRODE
Filed Dec. 1, 1964                                                              3 Sheets-Sheet 1

United States Patent Office 3,461,056
Patented Aug. 12, 1969

3,461,056
ELECTROLYTIC MACHINING AND GRINDING APPARATUS WITH GRAPHITE ELECTRODE
Sachio Maeda, Kobe, and Nagao Saito, Nishinomiya, Japan, assignors to Mitsubishi Denki Kabushiki-Kaisha, Tokyo, Japan
Filed Dec. 1, 1964, Ser. No. 415,025
Claims priority, application Japan, Dec. 4, 1963, 38/65,235; June 1, 1964, 39/30,848
Int. Cl. B23p *1/16, 1/02;* B01k *3/08*
U.S. Cl. 204—224      2 Claims

ABSTRACT OF THE DISCLOSURE

Electrolytic machining and grinding apparatus in which the electrode comprises a sintered material containing graphite or is coated with graphite and the electrolyte comprises an aqueous solution of a chloride selected from the group consisting of a chloride selected from the group consisting of sodium chloride and potassium chloride. An alternating current is applied between the electrode and the workpiece such that when the electrode acts as an anode electrode the current is of a predetermined fraction of the magnitude of the current flowing through the electrode and the workpiece in each of the other half cycles.

---

This invention relates to an electrolytically machining and grinding apparatus.

An electrolytically machining and grinding technique utilizing an alternating current having a commercial frequency or a high frequency or the like are effective for electrolytically machining and grinding workpieces comprised of sintered tungsten carbide alloys, sintered silver-tungsten alloys or sintered copper-tungsten alloys which are relatively difficult to be electrolytically machined with direct current, silver, copper, brasses, aluminum or alloys thereof. However, in electrolytically machining and grinding operation utilizing such alternating currents, a significant problem occurs that a machining electrode involved wears away in alternate half cycles of alternating current when the electrode acts as an anode electrode.

In order to reduce this wear of the machining electrode, there has been previously proposed a process of removing any precipitate on the electrode by passing a very low anode current through the electrode in alternate half cycles when the electrode acts as the anode electrode. However, where a period of time during which a workpiece is machined as the anode electrode is required to be nearly equal to that during which the workpiece is exposed to cations as a cathode electrode as in the abovementioned metals and alloys thereof, a wear of the machining electrode made of any usual metal approaches, in amount, a machined or ground amount of the workpiece.

A general object of the invention is to eliminate the abovementioned disadvantage.

An object of the invention is to provide an improved apparatus for effecting effective and efficient electrolytical machining and grinding of workpiece with only a very low wear of a machining electrode involved.

These objects of the invention are accomplished by the provision of a source of alternating current connected across a machining electrode and a workpiece and of the machining electrode either composed of an electrically conducting material containing graphite or made of an electrically conducting or insulating material and having its operating surface including applied thereto a thin layer of carbon.

Preferably, means may be provided for causing a current flowing through the machining electrode and the workpiece in alternate half cycles of alternating current when the machining electrode acts as an anode electrode to be of a predetermined fraction of a magnitude of a current flowing through the machining electrode and the workpiece in the other half cycles.

The invention will be more readily apparent from the following detailed description taken in conjunction with the accompanying drawings in which:

FIGS. 1*a* and *b* show respectively a combined electrical circuit element and a graph useful for explaining the principle of the invention;

Figure 1A:
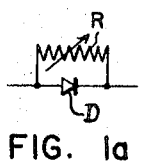

While the invention is described in terms of workpieces composed of sintered alloys of tungsten carbide system, it is equally applicable to workpieces composed of sintered alloys of the other systems and various metallic materials.

If a workpiece made of a sintered tungsten carbide alloy such as a WC-Co alloy or a WC-TiC-Co alloy is desired to be electrolytically machined or ground with direct current then a suitable electrolyte solution cannot be obtained and hence such a workpiece cannot be effectively and efficiently machined or ground. On the other hand, if a source of alternating current is used to effect electrolytic machining or grinding, then an aqueous solution of sodium chloride NaCl which can actually be handled with ease may be used to facilitate electrolytic machining or grinding of the workpieces as just described for the reasons as will be subsequently described.

In a half cycle of alternating current cobalt reacts with chlorine ions $Cl^-$ present in the electrolyte solution to form cobalt chlorides such as $CoCl_2$ and $CoCl_3$ which, in turn, are dissolved into the solution. Tungsten carbide WC and titanium chloride TiC are subject to anodic oxidation to form their oxides which are insoluble in water and remain adhering to the workpiece acting as the anode electrode. At the instant the workpiece has transferred from the anode to a cathode electrode the oxide thus produced react with sodium ions $Na^+$ to be dissolved, as the corresponding salts of sodium in the solution.

More specifically, in alternate half cycles of alternating current when the workpiece acts as the anode electrode tungsten carbide WC is changed to tungsten oxide $WC_3$; titanium carbide TiC is changed to titanium oxides $TiO_2$ and $TiO_3$; and cobalt Co is changed to cobalt chloride $CoCl_2$ which, in turn, deposits as cobalt hydroxide $Co_5(OH)_2$. In the remaining half cycles of alternating current when the workpiece acts as the cathode electrode, tungsten oxide $WO_3$ is changed to sodium tungstate $Na_2WO_4$ soluble in water; titanium oxides $TiO_2$ and $TiO_3$ is combined with sodium ions $Na^+$ in the solution to form titanium titanate.

If a workpiece is made of silver, copper or brass it is subject to anodic polarization at a high current density thereby to interrupt substantially a flow of current therethrough. This results from the fact that the workpiece undergoes anodic oxidation to have an oxide coating formed on its surface. In the next subsequent half cycle of alternating current this oxide coating is reduced with hydrogen ions $H^+$ to be dissolved in the solution. Workpieces made of sintered tungsten-silver alloys or sintered tungsten-copper alloys or the like are dissolved in the electrolyte solutions in the similar manner.

A machining electrode made of a metallic material containing graphite will now be discussed. In alternate half cycles of alternating current in which the electrode acts as the anode electrode, a graphite electrode slightly strips off by the stream of the solution flowing past while rubbing on the same but is not dissolved in the solution. At the same time, oxygen generated on the anode electrode will oxide slightly the electrode to produce carbon dioxide. However, the results of experiments indicated that the graphite electrodes do not reduce their dimensions and that their volumes may rather increase by impregnation of the associated electrolyte solutions into the same. Thus the graphite electrodes can be considered as not reducing their volume in operation and are disadvantageous only in that they are mechanically brittle.

In order to compensate for the mechanical brittleness of the graphite electrode, electrodes may be composed of sintered alloys containing graphite and nickel, iron lead or copper or the like. The results of experiments indicated that there is no fear that such electrodes will be dissolved in the associated electrolyte solutions due to the transition of the electrodes from the anode to the cathode electrode and vice versa for each half cycle of alternating current. This results from a graphite coating on the surface of the electrode even though it would be more or less dissolved in the electrolyte solution.

The sintered materials including from approximately 80 to 90% by weight of nickel, iron or copper and the balance graphite exhibits a high strength and a high electrical conductivity and is excellent in workability such as a machinability with which it can be formed into an electrode.

Due to lead having its electrochemical equivalent lower than other metals, electrodes made of sintered graphite-lead alloys do not appreciably decrease their volume even in alternate half cycles of alternating current in which it acts as the anode electrode. However such alloys are very soft so that a mixture of powdered graphite, lead and tin may be sintered to provide an electrode material. A preferred composition of such materials comprises, by weight, 10% of powdered graphite, 40% of tin and 50% of lead.

The electrodes composed of the sintered alloys containing graphite, and nickel, iron, copper or lead and tin in the proportions as above specified are substantially equal in wear to the electrode composed of graphite alone because they have their surfaces coated with graphite and are not actually subject to wear other than mechanical ones as previously described.

Also machining electrodes composed of gray iron exhibits very low wear. As an example, such an electrode 12 mm. in outside diameter and 6 mm. in inside diameter or 85 mm.$^2$ in cross sectional area was used to electrolytically machine a workpiece of sintered tungsten carbide alloy comprising 92% WC and 8% Co in an electrolyte solution under a pressure of 15 kg./cm.$^2$ with a single phase AC current of from 40 to 50 a. at a current density of from 47 to 59 a./cm.$^2$. The results were obtained as shown in Table I.

TABLE I.—COMPARISION OF WEAR OF 92% WC-8% Co WORKPIECE AND GRAY IRON ELECTRODE

| | Length of wear in mm. | Weight of wear in gr. | Percentage wear in percent [1] |
|---|---|---|---|
| Workpiece | 0.9 | 1.13 | 100 |
| Electrode | 0.1 | 0.164 | 14 |

[1] It is assumed that the percentage wear of the workpiece is 100%

For purpose of comparison, the experiments were repeated with a brass electrode of the same dimension under the similar conditions except for an alternating current of 50 to 60 a. and a current density of 59 to 71 a./cm.$^2$ and the results indicated in Table II were obtained.

TABLE II.—COMPARISON OF WEAR OF 92% WC-8% Co WORKPIECE AND BRASS ELECTRODE

| | Length of wear in mm. | Weight of wear in gr. | Percentage wear in percent |
|---|---|---|---|
| Workpiece | 1.0 | 1.26 | 100 |
| Electrode | 3.7 | 2.71 | 214 |

Further soft steel electrodes exhibited a percentage wear of about 200%.

From the foregoing it has been found that any machining electrode containing graphite even in a small amount is very low in wear.

Suitable examples of the materials for the present electrode involve natural and man-made graphites, gray iron, sintered graphite-iron alloy, sintered graphite-copper alloys, sintered graphite-lead alloys and the like. It has been found that the machining electrode is preferably composed of a sintered alloy including from 10 to 40% by weight of graphite and the balance copper, natural or man-made graphite having its purity of at least 99% or a gray iron including from 2 to 5% of graphite.

In order to increase the mechanical strength of graphitic electrode, any suitable material such as an electrically conducting material or an electrically insulating material can be first formed into a desired shape to provide an electrode proper and then the surface of its main body and more particularly that portion of the surface to face an associated workpiece in electrolytically machining or grinding operation is applied with a thin layer of graphite. For this purpose a mixture of a suitable amount of graphite and any suitable binder may be coated on the necessary portion of the surface of the electrode proper flowed by drying. However, the graphite layer may be formed by any other known technique. The production of the electrodes proper by using electrically insulating materials is advantageous in that the electrodes can be very easily formed in various complicated configurations because the insulating material can be very easily molded in such configurations. In this case, it is to be noted that means should be provided for applying an AC voltage to a thin layer of graphite on the surface of the electrode.

According to the teachings of the invention, a source of alternating current is connected across the machining electrode and the workpiece. Preferably the source may provide such a current flowing through the electrode and the workpiece that the magnitude of the current portion in alternate half cycles when the electrode acts as the anode electrode is of a predetermined fraction of that of the current portion in the other half cycles as will be subsequently described in conjunction with FIG. 1.

Figure 1B:
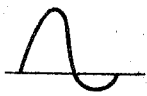

In FIG. 1 wherein FIG. 1a shows a combined circuit element suitable for use with the invention and FIG. 1b shows a wave form provided by such element. A half-wave rectifier or semiconductor D is connected in parallel circuit relationship to a variable resistor R. The diode D permits a current to flow only in one direction therethrough. Since a current in the opposite direction can flow through the variable resistor R the resistance of the resistor is controlled to provide a current waveform as illustrated in FIG. 1b. In FIG. 1b a curve portion above the time axis represents a waveform of current flowing through the diode D and a curve portion below the time axis represents a waveform of current flowing through the resistor.

Experiments were conducted with both commercial source of alternating current and a source of electric current of the type wherein a current delivered thereby reduces its amplitude in alternate half cycles when a machining electrode acts as the anode electrode. The results thereof indicated that a machining rate at which tungsten carbide workpiece was electrolytically machined was greatest in the case of the commercial source of alternating current and that the lower the flow of current in the alternate half cycles, when the electrode acts as the anode electrode, the lower the wear of the electrode.

When workpieces composed of a sintered alloy including 92% WC and 8% Co were electrically machined in an electrolyte solution under a pressure of 15 kg./cm.² with a current waveform as illustrated in FIG. 1b, provided by a parallel combination of the resistor R and the semiconductor diode D with the resistance R varied, the following results were obtained. A machining current ranged from 50 to 60a.

TABLE III.—EFFECT OF RESISTANCE R UPON WEARS OF WORKPIECE AND ELECTRODE AND FINISHED SURFACE OF WORKPIECE

| Material | R=0 | | | R=0.25Ω | | | R=0.5Ω | | | R=∞ |
|---|---|---|---|---|---|---|---|---|---|---|
| | Length of wear in mm. | Weight of wear in gr. | Percentage wear in percent | Length of wear in mm. | Weight of wear in gr. | Percentage wear in percent [1] | Length of wear in mm. | Weight of wear in gr. | Percentage wear in percent | |
| Workpiece, 92% WC-80% Co | 1.00 | 1.24 | 100 | 0.85 | 1.05 | 100 | 0.75 | 0.94 | 100 | |
| Electrode | | | | | | | | | | |
| Gray iron | 0.1 | 0.16 | 14 | | | | | | | |
| 60% Cu-40% Zn Brass | 3.0 | 2.71 | 214 | 1.90 | 1.4 | 130 | 1.3 | 0.95 | 100 | |
| Finished surface | | 3-10 | | | 1-5 | | | 5-15 | | |

[1] Figures for the finished surface are represented by the maximum height of their irregularity in microns.

From Table III it will be appreciated that any decrease in current flowing through the electrode in alternate half cycles of alternating current when the electrode acts as the anode is not very advantageous to a reduction in wear of the electrode and rather leads to a decrease in amount of the workpiece machined. Only as to the finished surface, the resistor R having a magnitude of 0.25 ohm gave the best results.

Therefore, if the primary purpose is to improve the finished surfaces of workpieces and a decrease in electrode wear is a subordinate purpose than a parallel combination of a half-wave rectifier and a resistor may be preferably used as illustrated in FIGS. 2 through 5.

Figure 2:
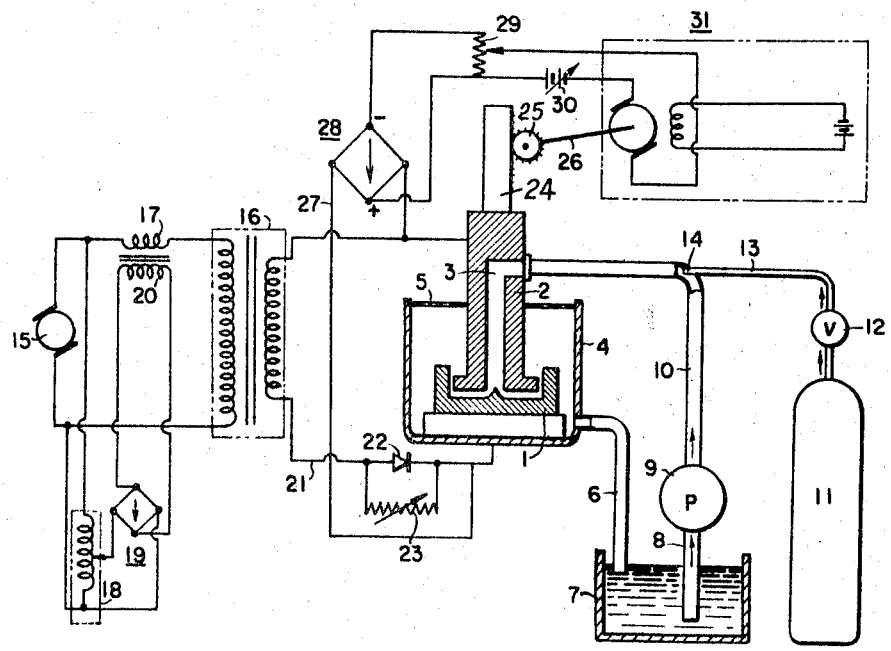
FIG. 2 shows a diagrammatic view of an electrolytically machining apparatus constructed in accordance with the teachings of the invention.
Figure 3:
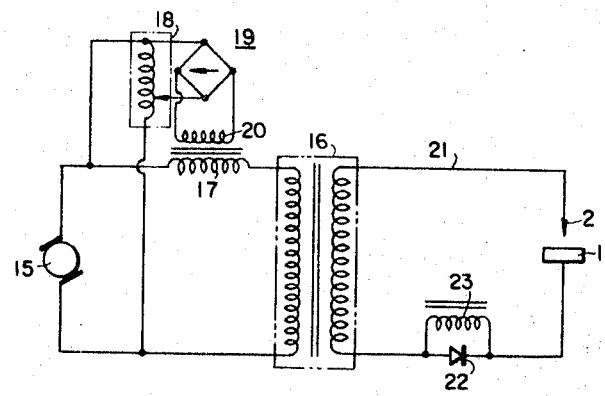
FIGS. 3 through 5 show diagrams of modifications of the electrical circuitries capable of being used with the invention.
Figure 4:
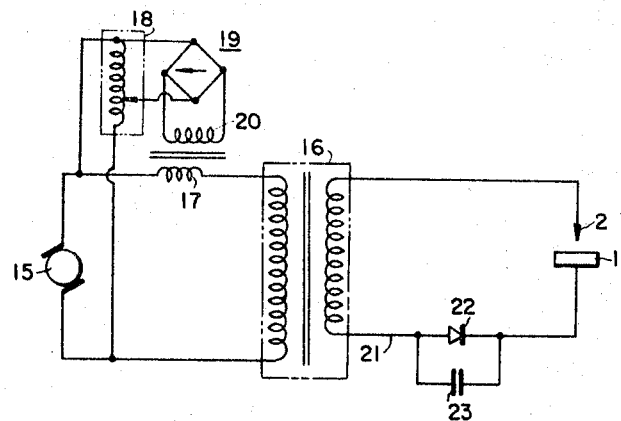

Referring now to FIG. 2, there is illustrated one form of electrolytically machining apparatus comprising a workpiece 1, a machining electrode 2 including a central bore 3 for spouting an electrolyte solution against the workpiece, and an electrolyser 4 for accommodating the workpiece 1 and the electrode 2 and having a cover 5 for closing the top thereof, and an exhaust conduit 6 connected to a reservoir 7. A feed conduit 7 has its lower end portion immersed into the electrolyte solution accommodated in the reservoir 7 and is operatively connected at the other end to a feed pump 9 which, in turn, is operatively connected to the central bore 3 in the electrode through a conduit 10. In order to mix a suitable gas with the electrolyte solution, a reservoir 11 for such a gas is connected through a pressure reducing valve 12 to a pipe 13 opening in the conduit 10 at any suitable position.

A source of alternating current 15 is connected to an input to transformer 16 through a current limiting reactor 17. The reactor 17 is connected to a variable auto transformer 18 coupled across input terminals of a rectifier 19 having its output terminals connected across an exciting winding 20 for controlling the impedance of the reactor 17. The transformer 16 has its secondary winding connected at one end to the electrolyzer and hence the workpiece 1 through a parallel combination of a half-wave rectifier 22 and a variable resistor 23 and at the other end to the machining electrode 2.

Rigidly secured to the machining electrode 2 at its upper end is a feed rack 24 meshing a drive pinion 25. The pinion 25 includes a coupling shaft 26 connected to a control device 27.

A full wave rectifier 28 has its input coupled across the workpiece 1 and the electrode 2 and its output connected across a potentiometer 29. The potentiometer 29 has an adjustable tap and one of end terminals connected across the input of the control device 27 through a source of reference potential 30. With the arrangement illustrated it will be appreciated that the control device 27 is operative to compare the reference potential from the source 30 with a rectifier voltage across a gap formed between the electrode and the workpiece and to drive the pinion 25 thereby to maintain the machining gap at a predetermined magnitude.

The parallel combination of the half-wave rectifier 22 and the variable resistor 23 serves to determine a ratio of a current flowing through the gap in alternate half cycles of alternating current wherein the electrode acts as the anode, to a current flowing the same in the remaining half cycles wherein the electrode acts as the cathode.

Instead of the variable resistor 23 a variable inductance 23' (see FIG. 3) or a variable capacitor 23" (see FIG. 4) may be used with satisfactory result.

Figure 5:
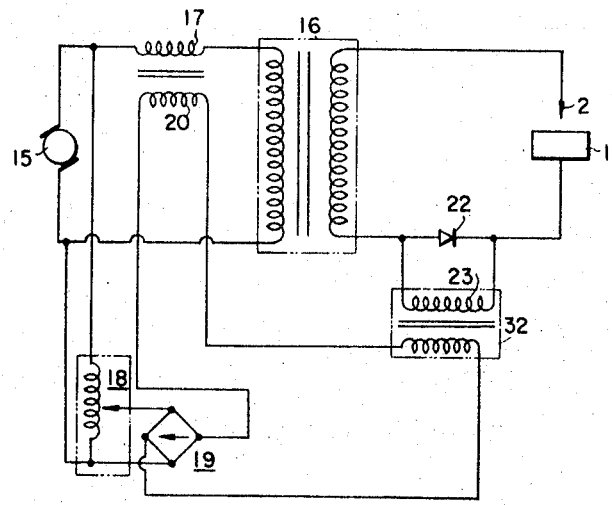

In an arrangement illustrated in FIG. 5, a reactor 32 has its secondary winding 23a connected in parallel to a half-wave rectifier 23 and serving to determine the current ratio just described by a voltage developed across the secondary winding.

In the arrangements illustrated in FIGS. 2 through 5, it is to be understood that the machining electrodes involved are made of any suitable metal material as previously described and that an aqueous solution of sodium chloride can be conveniently used as the electrolyte solution.

Figure 6:
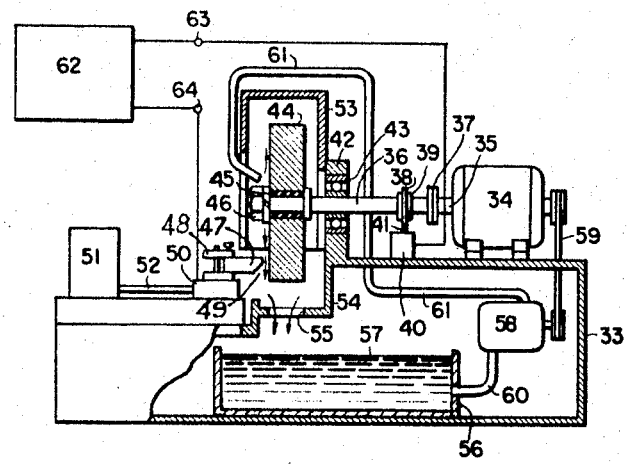
FIG. 6 shows a diagrammatic view of an electrolytically grinding apparatus constructed in accordance with the teachings of the invention.

Referring now to FIG. 6, there is illustrated an electrolytically grinding apparatus constructed in accordance with the teachings of the invention. The apparatus illustrated comprises a base block 33 and an electric motor 34 suitably disposed on the base block 33 and having a rotary shaft 35 connected to a shaft 36 through a coupling 37. Mounted on the peripheral surface of the shaft 36 is slip ring 38 through an insulation 39 which slip ring engages a brush 40 carried by a brush holder 41 disposed on the base block 33. A bearing unit 42 rotatably journals the shaft 36 through a ball bearing 43.

The shaft 36 has a disk-shaped grinding electrode 44 fitted onto the free end portion of the same through an insulating bushing 45 and disposed in place by a nut 46 screwed onto the shaft 36. According to the teachings of the invention the electrode is made of any of the materials as previously described. A workpiece 47 is carried by a workpiece holder 48 in such a manner that it is disposed oppositely to the grinding electrode 44 with a very narrow grinding gap 49 formed therebetween. The workpieces 47 may be, for example, in the form of a cutting tool and has a tool edge composed, for example, of a sintered alloy of WC-Co, WC-TiC-Co or TC-TaC-Co system. The holder 48 includes a base member 50 slidably disposed on the upper surface of the base block 33. The block 33 is provided on the lefthand end portion as viewed in FIG. 6 with a feed device 51 operatively connected to the base member 50 through a threaded cross rod 52. The feed device 51 serves to move the workpiece 47 toward the electrode 44 as the grinding proceeds.

As shown in FIG. 6, a cover 53 is secured to the bearing unit 42 to enclose the upper half of the grinding electrode 44 and a sink 55 is disposed on the base block 33 and below the machining electrode 44. The sink 55 is provided on the bottom with an opening 55 facing an open top end of a reservoir 56 disposed within the base block 33. An electrolyte solution 57 including water and sodium chloride is accommodated in the reservoir 56 and can be supplied to the grinding gap 49 by the operation of a feed pump 58 also disposed within the base block 33. The pump 58 is energized by the motor 34 through a belt 59 to supply the solution 57 to the gap 49 through a conduit 60, the pump, and a condit 61 extending through the upper surface of the base block 33 and opening in the gap 49.

A source of alternating current 62 has one of output terminal 63 connected to the grinding electrode 44 through the brush holder 41, the brush 40 and the slip ring 38 and the other output terminal 64 connected to the workpiece 4 through the base member 50 and the holder 48. The source 62 supplies across the workpieces 47 and the machining electrode 44 an electrical energy periodically varied in polarity such as an AC power of a commercial frequency or any high frequency or an AC voltage superposed with a DC voltage. The source 62 may include advantageously a parallel combination of a half-wave rectifier and a variable resistor such as shown in FIG. 1a.

In operation the motor 34 is driven to rotate the grinding electrode 44 as well as driving the pump 58. The pump 58 is operated to supply the electrolyte solution 57 from the reservoir 56 through the conduit 60, the pump and the conduit 61 in the central region on the lefthand surface as viewed in FIG. 6 of the grinding electrode 44. The rotational movement of the electrode 44 causes the electrolyte solution to flow toward the periphery of the electrode and then pass through the grinding gap 49 between the grinding electrode 44 and the workpiece 47. The portion of the electrolyte solution located in the grinding gap 49 is electrolysed with the energy supplied thereto to react with the material for the workpiece 47. This reaction causes grinding of the workpieces. As the grinding operation proceeds the feed device 51 is operated to move the workpiece 47 toward the grinding electrode 44 until the workpiece is ground to a predetermined extent.

As an example, the apparatus illustrated in FIG. 6 was operated to electrolytically grind a workpiece of sintered WC-Co system alloy in the form of a right hexahedron (8 mm. x 20 mm. x 25 mm.) and having an area to be ground of 8 mm. x 20 mm. or 1.6 cm.$^2$, in an aqueous solution of 20% sodium chloride. The grinding electrode used was made of a gray iron including 3% of free graphite into a circular disk having a diameter of 150 mm. and a thickness 20 mm. The electrode was rotated at 600 r.p.m. and a voltage of 10 v. was applied across the grinding gap with a current of 200 a. flowing through the gap. After 10 minutes the workpiece was electrolytically ground to a depth of about 2 mm. corresponding to the removed weight of 30 grams. The electrode was substantially free from wear.

From the foregoing, it will be appreciated that by the provision of a machining electrode including graphite in the main body or on the surface, the invention makes it possible to electrolytically machine and/or grind special workpieces composed of sintered tungsten carbide alloy or the like in easy and rapid manner. Further an electrolyte solution is required only to be an aqueous solution of sodium chloride easily available and harmless.

While the invention has been described in conjunction with certain preferred embodiments thereof it is to be understood that various changes and modifications may be made without departing from the spirit and scope of the invention. For example, an aqueous solution of potassium chloride may be equally used as the electrolyte solution.

What we claim is:

1. An electrolytic machining apparatus comprising, an electrolyzer, means for supporting a workpiece and a machining electrode disposed in opposed relationship within the electrolyzer, said electrode having an injection opening for supplying an electrolyte therethrough, means to supply an electrolyte comprising an aqueous solution of sodium or potassium chloride applied on the workpiece from said injection opening in the machining electrode, and a source of alternating current connected across the workpiece and the machining electrode to electrolytically machine the workpiece, said machining electrode comprising graphite, and means provided for causing a magnitude of a current flowing through the machining electrode and the workpiece in alternate half cycles of alternating current when the machining electrode acts as an anode electrode to be of a predetermined fraction of a magnitude of a current flowing through the workpiece and the machining electrode in the other half cycles and said machining electrode being composed of a sintered material containing from about 10 to 40% of graphite and the balance copper.

2. An electrolytic grinding apparatus comprising, an electrolyzer, means for supporting a workpiece and a grinding electrode disposed in opposed relationship within the electrolyzer to form a grinding gap therebetween, means for supplying an electrolyte, comprising an aqueous solution of sodium or potassium chloride to the grinding gap, and a source of alternating current connected across the grinding electrode and the workpiece, said grinding electrode comprising graphite, means provided for causing a magnitude of a current flowing through the grinding electrode and the workpiece in alternate half cycles of alternating current when the grinding electrode acts as an anode electrode to be of a predetermined fraction of a magnitude of a current flowing through the workpiece and the grinding electrode in the other half cycles, and said grinding electrode comprising an electrically conductive material and comprising an operating surface coated with carbon particles.

References Cited

UNITED STATES PATENTS

| | | | |
|---|---|---|---|
| 3,035,151 | 5/1962 | Weglarz | 219—69 |
| 3,357,912 | 12/1967 | Inoue | 204—224 |
| 3,214,361 | 10/1965 | Williams | 204—224 |
| 3,243,365 | 3/1966 | Aikin | 204—224 |
| 3,252,881 | 5/1966 | Inoue | 204—224 XR |
| 3,268,434 | 8/1966 | Weingartner | 204—224 |
| 3,293,166 | 12/1966 | Cowing | 204—224 |

JOHN H. MACK, Primary Examiner

D. R. VALENTINE, Assistant Examiner

U.S. Cl. X.R.

204—290, 292, 294; 219—69